United States Patent
Huang et al.

(10) Patent No.: US 7,277,503 B2
(45) Date of Patent: Oct. 2, 2007

(54) APPARATUS AND METHOD FOR SYNCHRONIZING SAMPLING FREQUENCY AND CARRIER FREQUENCY IN A MULTI-CARRIER COMMUNICATION SYSTEM

(75) Inventors: Fong-Ching Huang, KaoHsiung (TW); Der-Zheng Liu, TaiNan (TW)

(73) Assignee: Realtek Semiconductor Corp., Hsinchu (TW)

( * ) Notice: Subject to any disclaimer, the term of this patent is extended or adjusted under 35 U.S.C. 154(b) by 820 days.

(21) Appl. No.: 10/640,034

(22) Filed: Aug. 14, 2003

(65) Prior Publication Data
US 2004/0032854 A1    Feb. 19, 2004

(30) Foreign Application Priority Data
Aug. 16, 2002    (TW)    ............................. 91118477 A

(51) Int. Cl.
     *H03D 3/18*    (2006.01)
(52) U.S. Cl. ..................... 375/327; 375/260; 375/377; 331/2; 331/10; 455/255; 332/128; 348/555; 360/77.02
(58) Field of Classification Search ................ 375/326, 375/141, 377; 331/2, 10; 455/255; 332/128; 348/555; 360/77.02
See application file for complete search history.

(56) References Cited

U.S. PATENT DOCUMENTS

| | | | | |
|---|---|---|---|---|
| 4,987,386 A * | 1/1991 | Poklemba et al. | ............. | 331/10 |
| 5,075,639 A * | 12/1991 | Taya | .............................. | 331/2 |
| 5,105,168 A * | 4/1992 | DaSilva | .......................... | 331/2 |
| 5,161,004 A * | 11/1992 | Egger | .......................... | 348/555 |
| 5,285,474 A | 2/1994 | Chow et al. | | |
| 5,734,302 A * | 3/1998 | Teng et al. | .................. | 332/128 |
| 6,041,222 A * | 3/2000 | Horton et al. | .............. | 455/255 |
| 6,751,270 B1 * | 6/2004 | Choi et al. | ................... | 375/326 |
| 6,862,313 B2 * | 3/2005 | Walley et al. | ............... | 375/141 |
| 2002/0080516 A1 * | 6/2002 | Bhakta et al. | ........... | 360/77.02 |

OTHER PUBLICATIONS

Thierry et al.; Synchronization with DMT Modulation; IEEE Communications Magazine; Apr. 1999; pp. 80-86.*
Thierry et al.; Synchronizabilty of OFDM Signals. Communication Engineering Lab, University of Ghent; IEEE 1995; pp. 2054-2058.*
Jack S. Chow, Jerry C. Tu, and J.M. Cioffi, "A Discrete Multitone Transceiver System for HDSL Applications", IEEE J. on Sel Areas in Comm., vol. 9, No. 6, pp. 895-908, Aug. 1991.

(Continued)

*Primary Examiner*—Chieh M. Fan
*Assistant Examiner*—Sudhanshu C. Pathak
(74) *Attorney, Agent, or Firm*—Troxell Law Office, PLLC

(57) ABSTRACT

An apparatus and method for synchronizing sampling frequencies of a receiver and a transmitter of a multi-carrier communication system is provided. The receiver includes an estimator for estimating a frequency offset by employing an additional angle rotation of a received signal in frequency domain. The apparatus includes a compensation loop filter for generating a first output in response to a frequency offset compensation, an adder for adding the estimated frequency offset and the first output to generate a second output, and a loop filter for generating frequency offset compensation according to the second output. The method repeatedly applies the apparatus to generate frequency offset compensation, and then feeds it back to an oscillator to compensate the sampling frequency of the receiver. The apparatus and method can also be applied to a communication system with a carrier frequency offset.

20 Claims, 14 Drawing Sheets

OTHER PUBLICATIONS

J.S. Chow, J.M. Cioffi, and J.A.C. Bingham, "Equalizer training algorithms for multicarrier modulation system", ICC, pp. 761-765, May 1993.

J.W. Melsa, Richard C. Younce and Charles E. Rohrs, "Impulse Response Shortening for Discrete Multitone Transceivers", IEEE Trans. on Comm., vol. 44, No. 12, pp. 1662-1672, Dec. 1996.

N. Al-Dhahir and J.M. Cioffi, "Efficiently computed reduced-parameter input-aided MMSE equalizers for ML detection: A unified approach", IEEE Trans. on Info. Theory, vol. 42, pp. 903-915, May 1996.

N. Al-Dhahir and J.M. Cioffi, "Optimum finite-length equalization for multicarrier transceivers", IEEE Trans. on Comm., vol 44, pp. 56-63, Jan. 1996.

Werner Henkel, and Thomas Kessler, "Maximizing the Channel Capacity of Multicarrier Transmission by Suitable Adaptataion of the Time-Domain Equalizer", IEEE Trans. on Comm., vol. 48, No. 12, Dec. 2000.

Katleen et al., "Per Tone Equalization for DMT-Based Systems", IEEE Trans. on Comm., vol. 49, No. 1, Jan. 2001.

Guner Arslan et al., "Equalization for Discrete Multitone Transceivers to Maximize Bit Rate", IEEE Trans. on Signal processing.

Zheng Du, and Jinkang Zhu, "A pilot-based frequency offset tracking scheme in OFDM systems", 2001 International Conferences on Info-Tech and Info-Net, vol. 2, pp. 566-571, Beijing, China, Oct. 29, 2001-Nov. 1, 2001.

Yan Zhang and Xiaohu Yu, "An improved automatic frequency correction scheme for discontinous pilot mobile communication system," IEEE 2001 Spring Vehicular Technology Conference, vol. 3, pp. 1708-1712, Rhodes, Greece, May 6-9, 2001.

Yang-Seok, Choi, P.J. Voltz, and F.A. Cassara, "ML estimation of carrier frequency offset for multicarrier signals in Rayleigh fading channels, " IEEE Transactions on Vehicular Technology, vol. 50, pp. 644-655, Mar. 2001.

Bor-Sen Chen, and Chang-Lan Tsai, "Frequency offset estimation in an OFDM system," 2001 IEEE Third Workshop on Signal Processing Advances in Wireless Communications (SPAWC '01) pp. 150-153, Taiwan, Mar. 20-23, 2001.

M.J. Fernandez-Getino Garcia, O. Edfors, and J.M. Paez-Borrallo, "Frequency offset correction for coherent OFDM in wireless systems", IEEE Transactions on Consumer Electronics, vol. 47, pp. 187-193, Feb. 2001.

M.R. Dacca, G. Levin, and D. Wulich, "Frequency offset tracking in OFDM based on multicarrier PLL.", 21st Century Military Communications Conference, vol. 2, pp. 912-916, Oct. 22-25 2000.

John A. C. Bingham, "Multi-Carrier Modulation for Data Transmission: An Ideal Whose Time Has Come" IEEE Communication Magazine, May 1990, p. 5-14.

Thierry Pollet and Miguel Peeters, Alcatel "Synchronization with DMT Modulation" IEEE Communications Magazine, Apr. 1999.

Thierry Pollet, Paul Spruyt and March Moeneclaey, "The BER Performance of OFDM Systems Using Non-Synchronize Sampling", Proc. Globecom '94, San Francisco, CA, Dec. 27-29, 1994, pp. 253-257.

Leland B. Jackson, "Signals, Systems, and Transforms", Addison-Wesley Publishing Company, Inc., 1991, p. 410.

Guner Arslan et al., "Equalization for Discrete Multitone Transceivers to Maximize Bit Rate", IEEE Trans. on Signal processing, Dec. 2001, p. 3123-3135.

* cited by examiner

APPARATUS AND METHOD FOR SYNCHRONIZING SAMPLING FREQUENCY AND CARRIER FREQUENCY IN A MULTI-CARRIER COMMUNICATION SYSTEM

BACKGROUND OF THE INVENTION (a). Field of the Invention

The present invention relates in general to a multi-carrier communication system, and more particularly to a compensation apparatus and method for sampling and carrier frequency synchronization in a multi-carrier communication system.

(b). Description of the Prior Arts

Multi-carrier modulation is one of wideband technologies and increasingly important in recent years. FIG. 1 is a block diagram of a communication system 100 using multi-carrier modulation. The communication system 100 employs a set of N-point inverse fast Fourier transform (IFFT) 102 in the transmitter and the fast Fourier transform (FFT) 111 in the receiver to transceive data. A channel 106 is divided into N sub-channels, and signals of one sub-channel are orthogonal to those of any other sub-channels. Thus, the data transmitted in the sub-channels would not interfere each other, and inter-channel interference (ICI) can be avoided.

The set of N-point outputting from IFFT is called a symbol. To avoid inter-symbol interference (ISI) and ICI, it is common to add a "cyclic prefix" (CP) to each symbol, i.e. the last υ samples of each symbol are copy and added in the front of the symbol. Therefore, a symbol including (N+υ) samples is transceived each time. The circuits 103 in the transmitter and 110 in the receiver of FIG. 1 are used to add and remove cyclic prefixes respectively.

However, the conventional communication system 100 of FIG. 1 suffers the disadvantage of frequency offset. An analog-to-digital converter (ADC) 107 is used to sample signals with a sampling frequency $\hat{f}_s$ in the receiver. However, the sampling frequency $f_s$ of the digital-to-analog converter (DAC) 105 in the transmitter is inconsistent with the sampling frequency $\hat{f}_s$ at the receiver. Therefore, ICI is generated in the output of the FFT circuit 111, and a symbol timing error is also increased over time. The performance of the communication system is thus degraded seriously.

The conventional approach to overcome the above-disclosed problem is to utilize the delay-rotor property of the communication system 100. FIG. 2 is a diagram illustrating the delay-rotor property of the conventional communication system. Since the sampling frequency of the transmitter and that of the receiver are different, i.e. $f_s - \hat{f}_s = df_s \neq 0$, the symbol timing error will be accumulated. This timing error would cause the output signal of the FFT circuit 111 an additional angle rotation in the frequency domain. This rotation angle would also be increased over time, as shown in FIG. 2.

By utilizing the delay-rotor property, the communication system 100 may reserve a specific sub-channel for transmitting a given signal called pilot tone. When the receiver detects an additional angle rotation of the pilot tone in the frequency domain, the symbol timing error resulted from the sampling frequency offset can be estimated. FIG. 3 is a block diagram of a conventional architecture for dealing with the sampling frequency offset. As shown in FIG. 3, after the circuit 301 selects the pilot tone, the angle estimator 302 estimates the angle of frequency-domain signals and passes it to the first difference device 303 (i.e. $1-z^{-1}$) to calculate the additional angle rotation. Next, after being provided into the loop filter H(z) 304 and then the accumulator 305

$$\left(\text{i.e. } \frac{1}{1-z^{-1}}\right),$$

the angle rotation is fed back to a voltage-controlled crystal oscillator (VCXO) 306 to compensate the sampling frequency offset of the receiver.

However, the relationship between the sampling frequency offset and the rotation angle is not clear, it is difficult to design the loop filter 304. Besides, it takes a very long time for the feedback loop of FIG. 3 to track the sampling frequency offset. If the sampling frequency is time-variant, then the tracking performance would be impacted. Even worse that the feedback loop cannot track the sampling frequency offset.

In view of this, the present invention provides an apparatus and associated method that can track and compensate the sampling frequency offset more quickly, and tracking delay resulted from the feedback loop delay is also decreased compared to the conventional method. Meanwhile, the system can still maintain the low complexity as the conventional system.

SUMMARY OF THE INVENTION

The first objective of the present invention is to provide an apparatus for synchronizing frequencies of a receiver and a transmitter of a multi-carrier communication system, The receiver includes an estimator for estimating a frequency offset by using an additional angle rotation of a received signal in frequency domain. The apparatus includes a compensation loop filter for generating a first output in response to a frequency offset compensation. The apparatus also includes an adder for adding the estimated frequency offset and the first output from the estimator and the compensation loop filter respectively to generate a second output. The apparatus also includes a loop filter for generating the frequency offset compensation according to the second output. The frequency offset compensation is fed back to an oscillator to compensate the sampling frequency of the receiver, where the oscillator is used to generate the sampling frequency of the receiver.

The second objective of the present invention is to provide a method for sampling frequency synchronization by using the above apparatus. The core concept of the method is that the frequency offset estimated by the estimator can be considered as an outcome of the difference between frequency offsets of the transmitter and the receiver passing through a system response filter g(z). Thus, if the frequency offset compensation is passed through the compensation loop filter with a similar system response g'(z), and the output of the filter is added to the outcome for compensation, then, the sum is fed back to the oscillator of the receiver. The above process is repeated and the sampling frequency of the transmitter can be tracked step by step.

The third objective of the present invention is to apply the apparatus and method mentioned above to compensate carrier frequency offset. Carrier frequency is used to modulate baseband signals outputted by IFFT to a higher frequency band. When receiving carrier-modulated signals, the receiver demodulates them to baseband signals and then to the original transmitted signals by FFT. However, since carrier frequencies of the transmitter and the receiver are not

DETAILED DESCRIPTION OF THE PRESENT INVENTION

Figure 1:
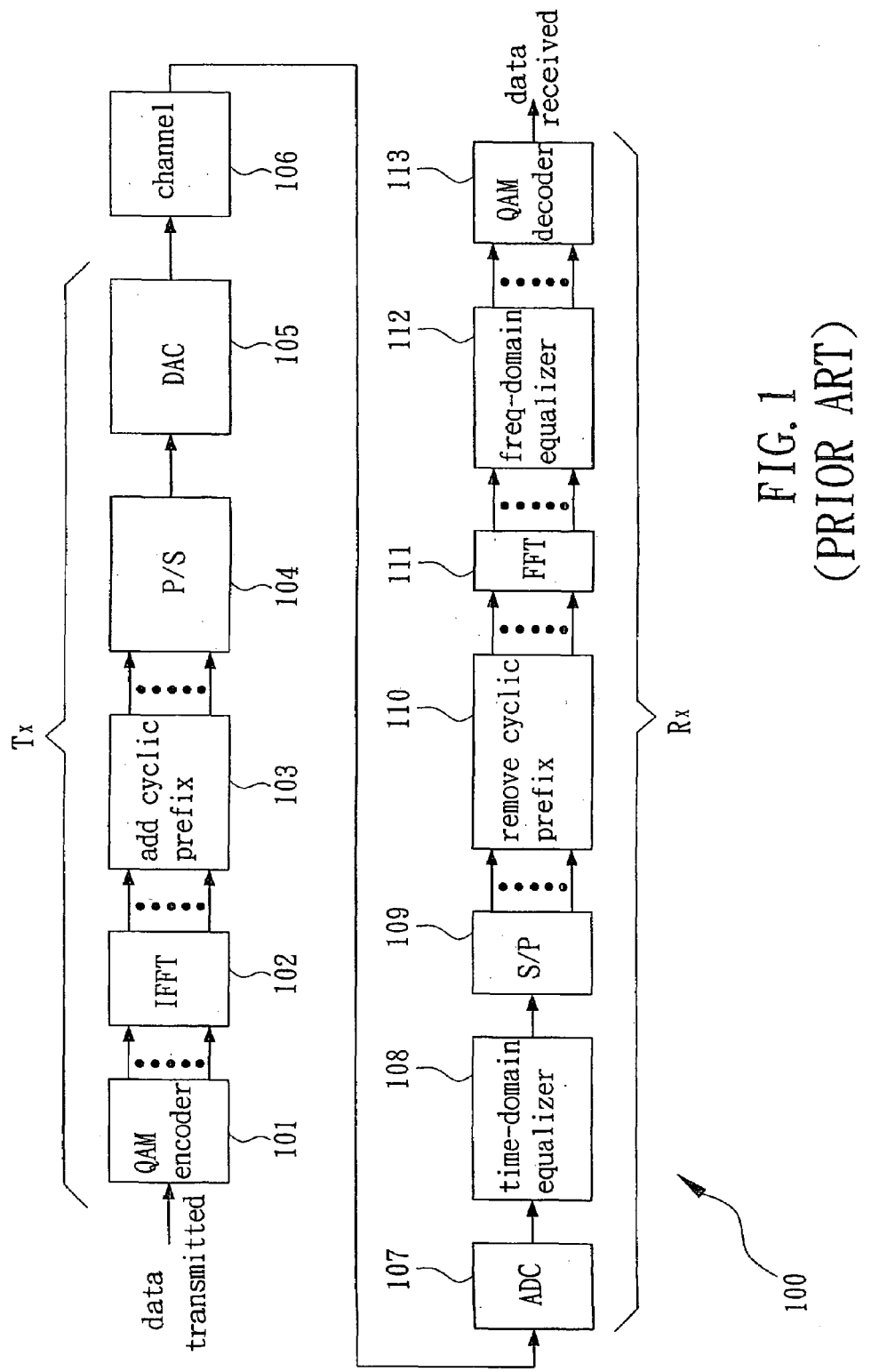
FIG. 1 is a block diagram of a communication system using multi-carrier modulation.
Figure 2:
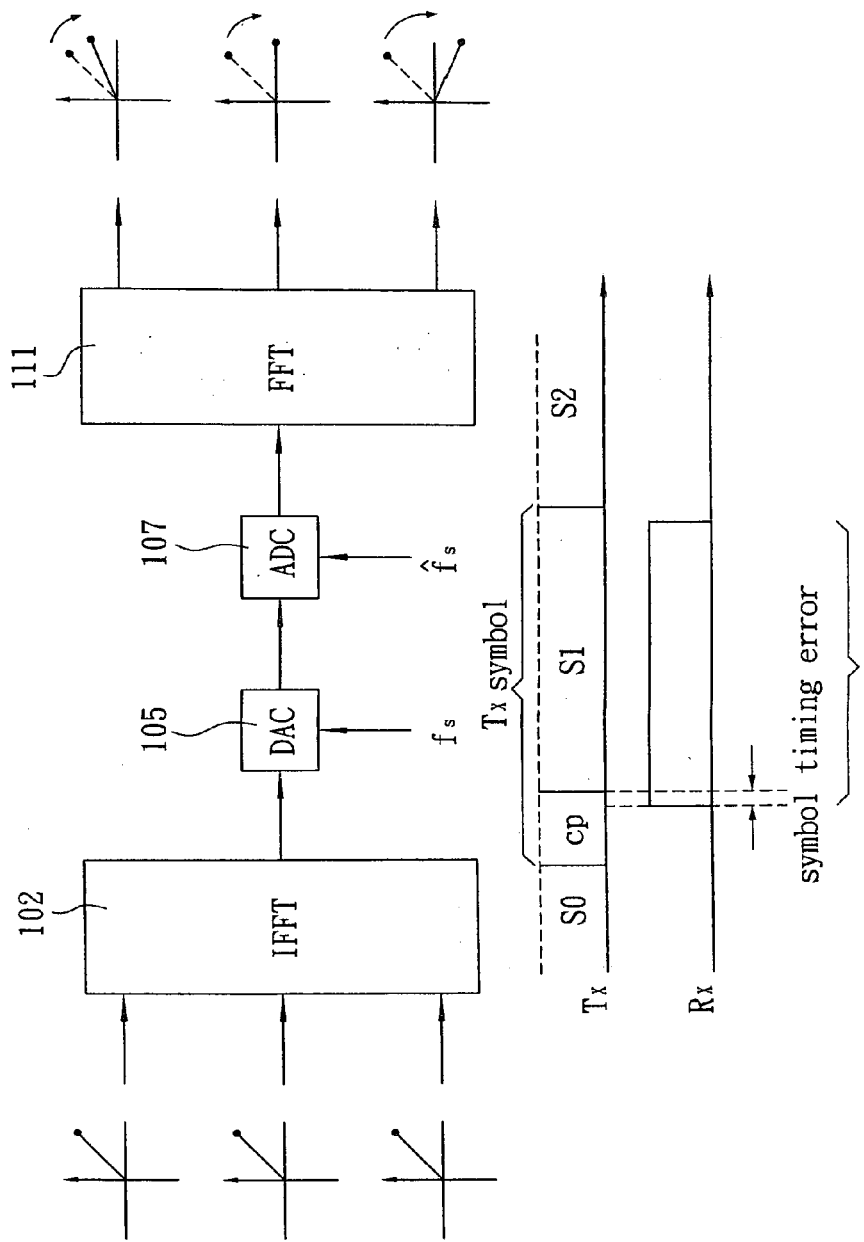
FIG. 2 is a diagram illustrating the delay-rotor property of the conventional communication system.
Figure 3:
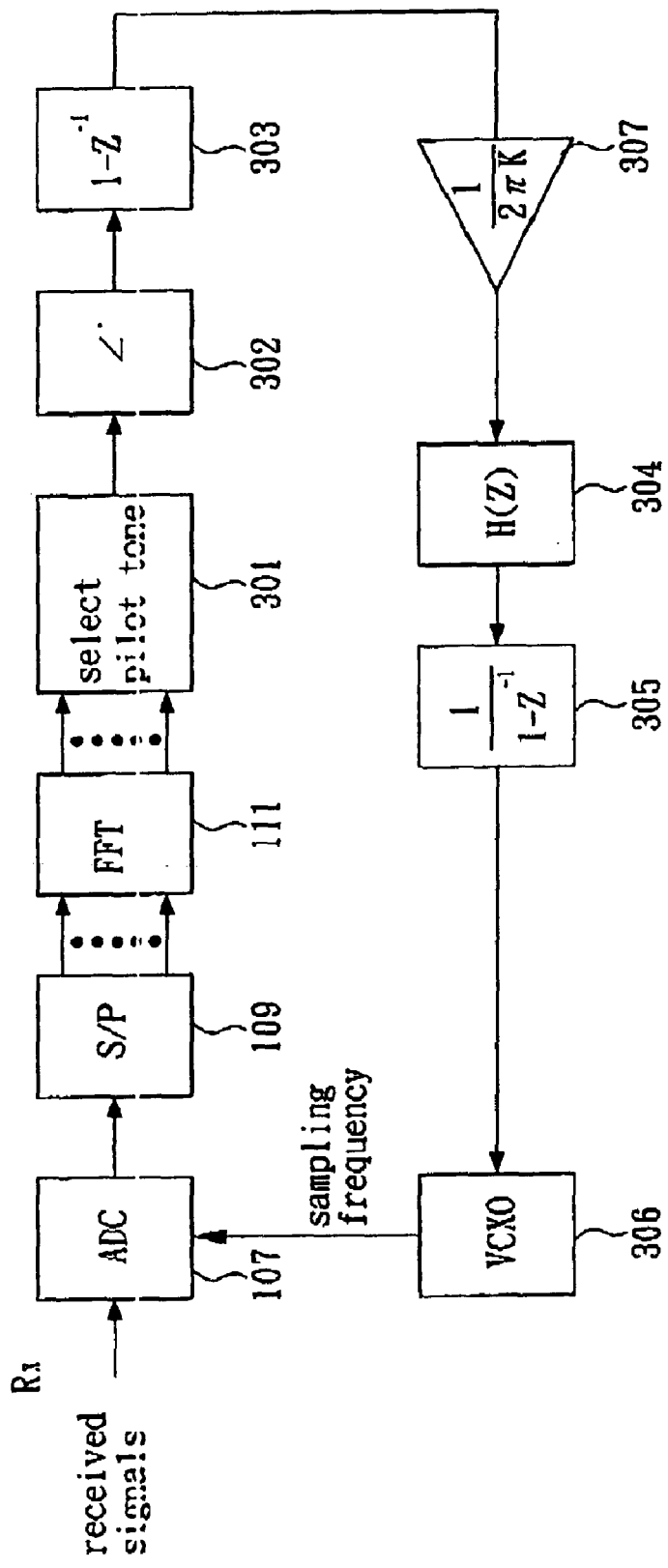
FIG. 3 is a block diagram of a conventional architecture for dealing with the sampling frequency offset.

It is assumed that the sampling frequency of the transmitter and that of the receiver of the multi-carrier system 100 in FIG. 1 change so slightly that these sampling frequencies can be considered as constant during transceiving the same symbol. Therefore, the difference $f_s(m) - \hat{f}_s(m) = df_s(m)$ can also be regarded as a constant, sphere m is the index of the symbol number. However, $df_s(m)$ may be different for different symbols. When $df_s(m)$ is not zero, the following effects will occur:

(1) "constellation distortion" is generated in the output of the FFT circuit 111. Without sampling frequency offset, the n-th time-domain sampling signal $S_m^k(n)$ of the k-th sub-channel of the m-th received symbol given by:

$$S_m^k(n) = a_m^k \cdot H_k \cdot e^{jw_k n}, n=0 \sim N-1 \quad (1\text{-}1)$$

where $a_m^k$ is the transmitted signal of the k-th sub-channel of the m-th symbol, $H_k$ is the channel frequency response of the k-th sub-channel, and $W_k = 2\pi k/N$ is the carrier frequency of the k-th sub-channel.

Since there is an offset between the sampling frequency $\hat{f}_s(m)$ of the receiver and the sampling frequency $f_s(m)$ of the transmitter, the actual signals sampled by the ADC 107 of the receiver are different from the signals shown in Equation (1-1). The sampling frequency offset $\Delta$ is defined as $df_s/f_s$, and thus $\hat{f}_s = f_s(1-\Delta)$. If $S_m^k(n)$ is used to represent the n-th time-domain sampling signal of the k-th sub-channel of the m-th symbol actually received by the receiver, then $$S_m^k(n) = a_m^k \cdot H_k \cdot e^{jw_k' n}, n=0 \sim N-1$$

where $$w_k' = 2\pi \frac{k}{N} \frac{f_s}{\hat{f}_s} = 2\pi \frac{k}{N} \frac{1}{1-\Delta} \approx 2\pi \frac{k}{N}(1+\Delta)$$

Next, the N time-domain samples of the k-th sub-channel of the m-th symbol are provided to the FFT circuit 111, and then N frequency-domain outputs as below are generated:

$$r_i = a_m^k H_k \Phi(w_i - w_k')_s, i=0 \sim N-1$$

where $$\Phi(w) = \frac{\sin(Nw/2)}{\sin(w/2)} e^{-j\frac{N-1}{2}w} = R(w)\varphi(w)$$

Since the N sub-channels transmit signals simultaneously in a practical system, the output signal of the k-th sub-channel of the FFT circuit it 111 is $$r_k = \sum_{j=0}^{N-1} a_m^j H_j \Phi(w_k - w_j')$$

$$= a_m^k H_k \Phi(w_k - w_k') + \underbrace{\sum_{\substack{j=0 \\ (j \neq k)}}^{N-1} a_m^j H_j \Phi(w_k - w_j')}_{JCJ \text{ is negligible}}$$

$$\approx a_m^k H_k \frac{\sin(\pi k \Delta)}{\sin(\pi k \Delta / N)} e^{j\frac{N-1}{N}\pi k \Delta}$$

Mathematically, if there is no sampling frequency offset, $r_k$ is equal to $a_m^k H_k \cdot N$, where $H_k$ can be removed by a frequency-dominion equalizer 112. However, since the sampling frequencies of the transmitter and the receiver are different (the frequency offset is $\Delta$), the received signal of the k-th sub-channel (k=0~N-1) is attenuated by $$\frac{\sin(\pi k \Delta)}{N \sin(\pi k \Delta / N)}$$

times and rotates with an angle of $$\left(\frac{N-1}{N}\right) \pi k \Delta \approx \pi k \Delta.$$

The former approximates to 1 and can be negligible, while the latter is not negligible. Therefore, the sampling frequency offset $\Delta$ would cause the signals of the k-th sub channel to rotate with the angle of $\pi k \Delta$ for the sampled symbol.

(2) A symbol timing error is generated for subsequent sampled symbols. Since the symbol timing error is accumulated to $(N+\upsilon) \cdot \Delta \cdot t_s$ (here $t_s = 1/f_s$) is after sampling a symbol. This symbol timing error causes an additional angle rotation of $$\left(\frac{N+\upsilon}{N}\right)2\pi k\Delta \approx 2\pi k\Delta$$

in the k-th output of the FFT circuit 111 when sampling the next symbol. The approximation is tenable because υ (the length of cyclic prefix) is much smaller than N.

If the sampling frequency offset Δ is regarded as a time-variant signal but is constant during transceiving the same symbol, in addition, the sampling frequency offset Δ is regarded as the input of the communication system 100, and the rotation angle of the output of the FFT circuit 111 is regarded as the output of the system 100, then the communication system 100 can be viewed as a sampling system, and a behavior model thereof can be derived based on the above conditions to further suggest the apparatus and method of the present invention.

Assume that the sampling frequency offset Δ(m) is an impulse signal as follows:

Δ(0)=Δ

Δ(m)=0, m>0 or m<0

Figure 4:
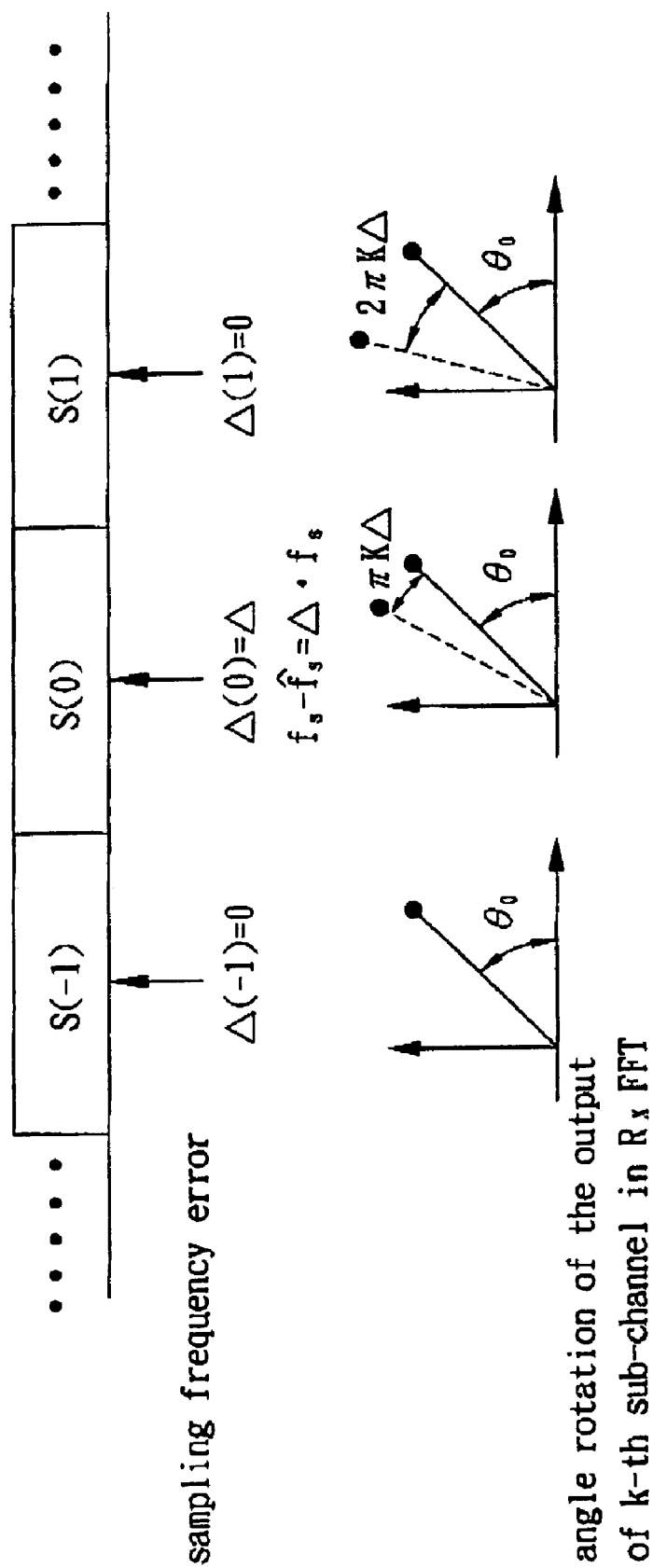
FIG. 4 is a diagram showing the relation between the frequency offset and the angle rotation of the output of k-th sub-channel from the FFT circuit.

FIG. 4 is a diagram showing the rotation angle of the output of the k-th sub-channel from the FFT circuit 111. From FIG. 4, the rotated angle $\theta_k(m)$ can be expressed as:

$\theta_k(m) = \angle r_k(m) = \theta_0$ when m<0

=$\theta_0 + \pi k\Delta$ when m=0

=$\theta_0 + 2\pi k\Delta$ when m>0 where $\theta_0 = \angle a_m^k \cdot H_k$

Therefore, the impulse response of the sampling system can be derived as (expressed in z-transform):

$$\theta_k(z) = \theta_0 + \pi k\Delta[a + bz^{-1} + bz^{-2} + \ldots] \quad (1\text{-}2)$$
$$\approx \theta_0 + \pi k\Delta[1 + 2z^{-1} + 2z^{-2} + \ldots]$$
$$\text{where } a = \frac{N-1}{N} \approx 1, \, b = 2\left(\frac{N+\upsilon}{N}\right) \approx 2$$

Figure 5A:
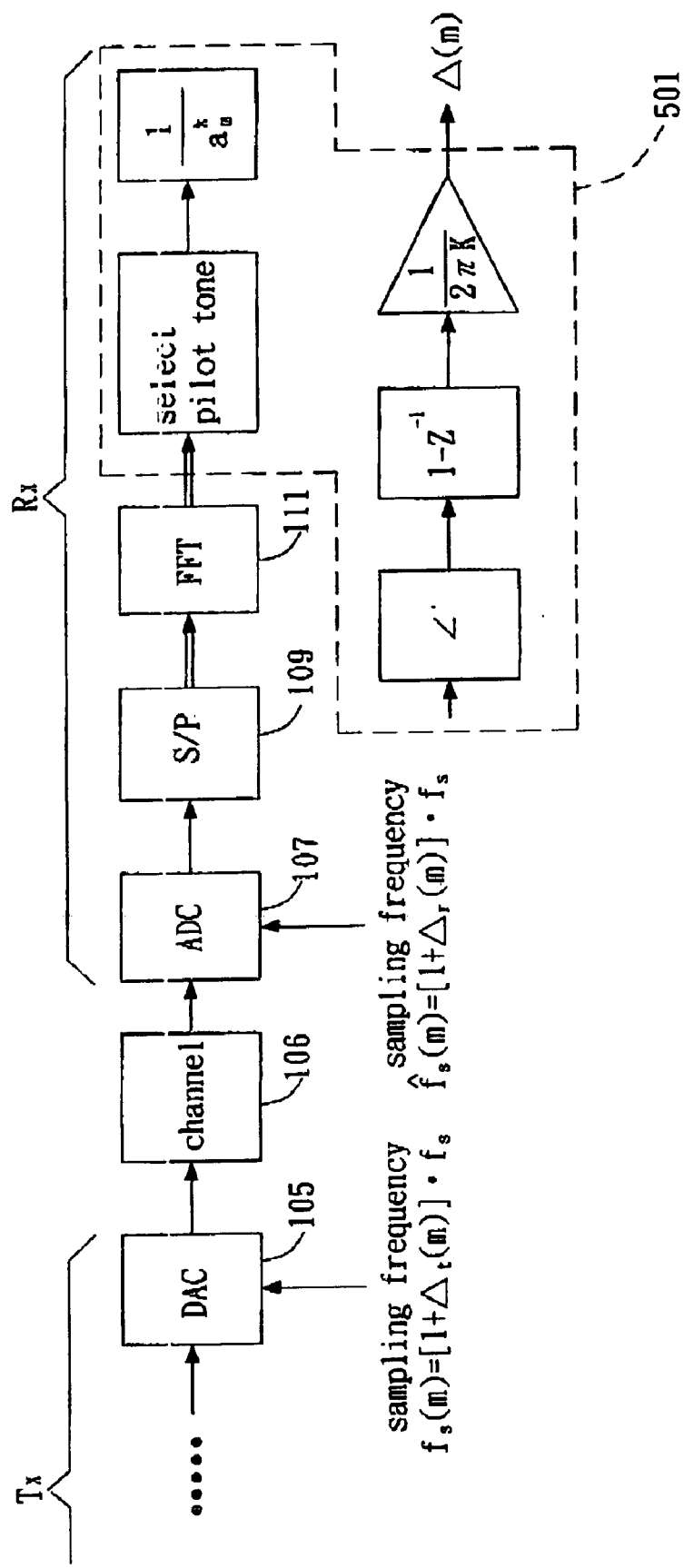
FIG. 5A is a block diagram showing the behavior of a multi-carrier system with a sampling frequency offset.
Figure 5B:
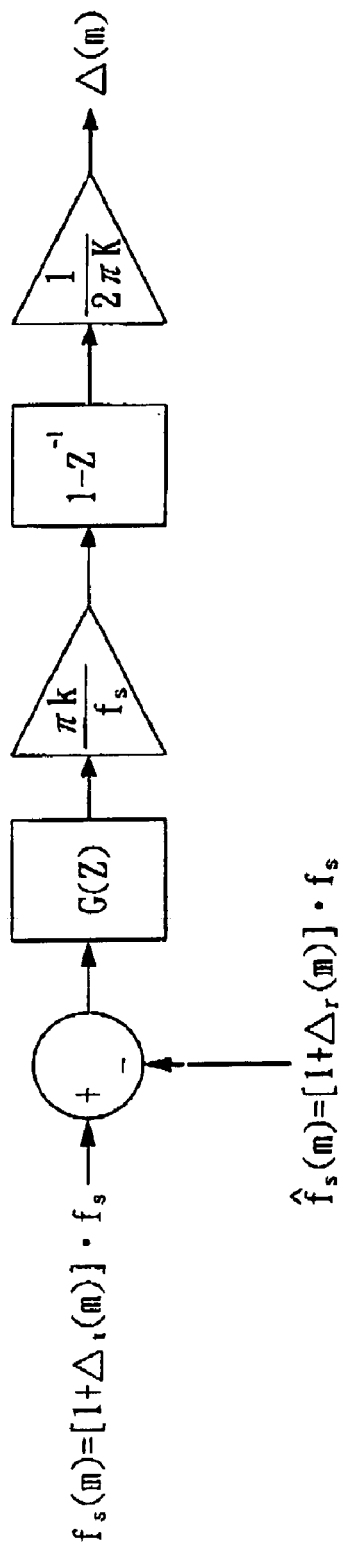
FIG. 5B is a simplified diagram of FIG. 5A.
Figure 5C:
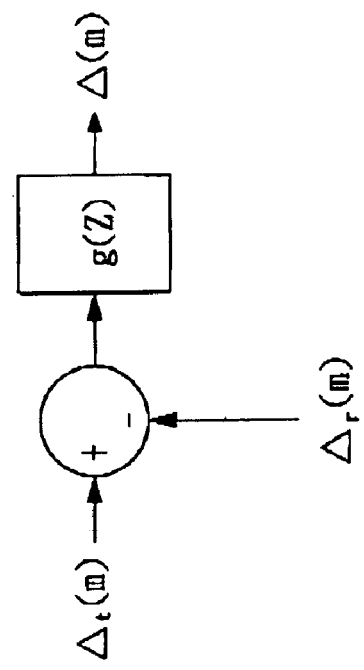
FIG. 5C is a further simplified diagram of FIG. 5B.

Since the sampling system is an approximately linear time-invariant (LTI) system, a behavior model is established as shown in the simplifying process of FIGS. 5A to 5C. FIG. 5A is a block diagram showing a the behavior of the sampling system, that is, how to obtain Δ(m) by choosing a pilot tone and using associated devices. In FIG. 5A, assume that the sampling frequency $f_s(m)$ of the transmitter is $[1+\Delta_t(m)]f_s$ and the sampling frequency $\hat{f}_s(m)$ of the receiver is $[1+\Delta_r(m)]f_s$, where both are changed according to the symbol number index m, and $f_s$ is an ideal sampling frequency required by the specification of the communication system 100. The dotted-line portion in FIG. 5A is the output of an estimator 501 for estimating the frequency offset Δ, and its operation is described as follows. After selecting the pilot tone (assumed as the k-th sub-channel in FIG. 5A), divide the pilot tone by $a_m^k$, and pass it through an angle estimator to obtain $\theta_k(m)$. Next, a signal d $\theta_k(m)$ (i.e. 2πkΔ(m)) by using a first difference device (i.e. $1-z^{-1}$), and passed through an amplifier with a gain of $$\frac{1}{2\pi k}$$

to obtain Δ(m). It should be noted that the signal-processing delay in FIG. 5A can be expressed as $z^{-D-1}$, where $z^{-D}$ is the total delay resulted from performing calculations (e.g. FFT) by the system 100, and $z^{-1}$ is the buffer delay, generated by the serial-to-parallel converter (S/P) 109.

FIG. 5B is a simplified diagram of FIG. 5A. That is, if the sampling frequency offset (i.e. $f_s(m) - \hat{f}_s(m)$) is regarded as the input of the sampling system, then $\theta_k(m)$ is obtained after passing the sampling frequency offset through a filter G(z) and an amplifier with a gain of $\pi k/f_s$, where G(z) equals to the $[a+bz^{-1}+bz^{-2}+\ldots]$ portion in Equation (1-2) multiplied by $z^{-D-1}$, that is, $G(z) = z^{-D-1}[a+bz^{-1}+bz^{-2}+\ldots]$ $\approx z^{-D-1}[1+2z^{-1}+2z^{-2}+\ldots]$ FIG. 5C is a further simplified diagram of FIG. 5B. A behavior model is obtained by removing $f_s$ and incorporating other devices. In this behavior model, the input $[\Delta_t(m) - \Delta_r(m)]$ is passed through a system response filter g(z), and an output Δ(m) is generated, where $$g(z) = \frac{1}{2}G(z)(1 - z^{-1}) \quad (1\text{-}3)$$
$$= \frac{1}{2}z^{-D-1}[a + (b-a)z^{-1}]$$
$$\approx \frac{1}{2}z^{-D-1}(1 + z^{-1})$$

The present invention is intended to design a tracking loop which enables the receiver of a multi-carrier communication system to compensate the sampling frequency offset quickly and correctly at the early period of signal transmission. Based on the previous analysis, if the communication system 100 contains a device similar to the estimator 501 of FIG. 5A, then the behavior model of FIG. 5C can be employed to analyze sampling behavior of the communication system 100, that is, $[\Delta_t(m) - \Delta_r(m)]$ (i.e. the sampling frequency offset) is used as an input to a system response filter g(z), and an output Δ(m) is then generated. The frequency offset estimated by the estimator 501 contains a result of the frequency offset of the receiver passing through g(z), where the result is negative (i.e. $-\Delta_r(m)g(z)$). Thus, if $\Delta_r(m)$ is passed through a filter with a similar system response g'(z), and the output of the filter is added to Δ(m) for compensation, then, the sum of the output of the filter and Δ(m) is added to the oscillator for generating the sampling frequency of the receiver. The above process is repeated and $\Delta_r(m)$ (and the sampling frequency of the transmitter $[1+\Delta_t(m)]f_s$) can be tracked step by step.

It should be noted that the design of the estimator 501 is not limited to that of FIG. 5A. For example, when the communication system 100 uses RF carriers, a design of the estimator 501 different from FIG. 5A needs to be adopted.

Figure 6A:
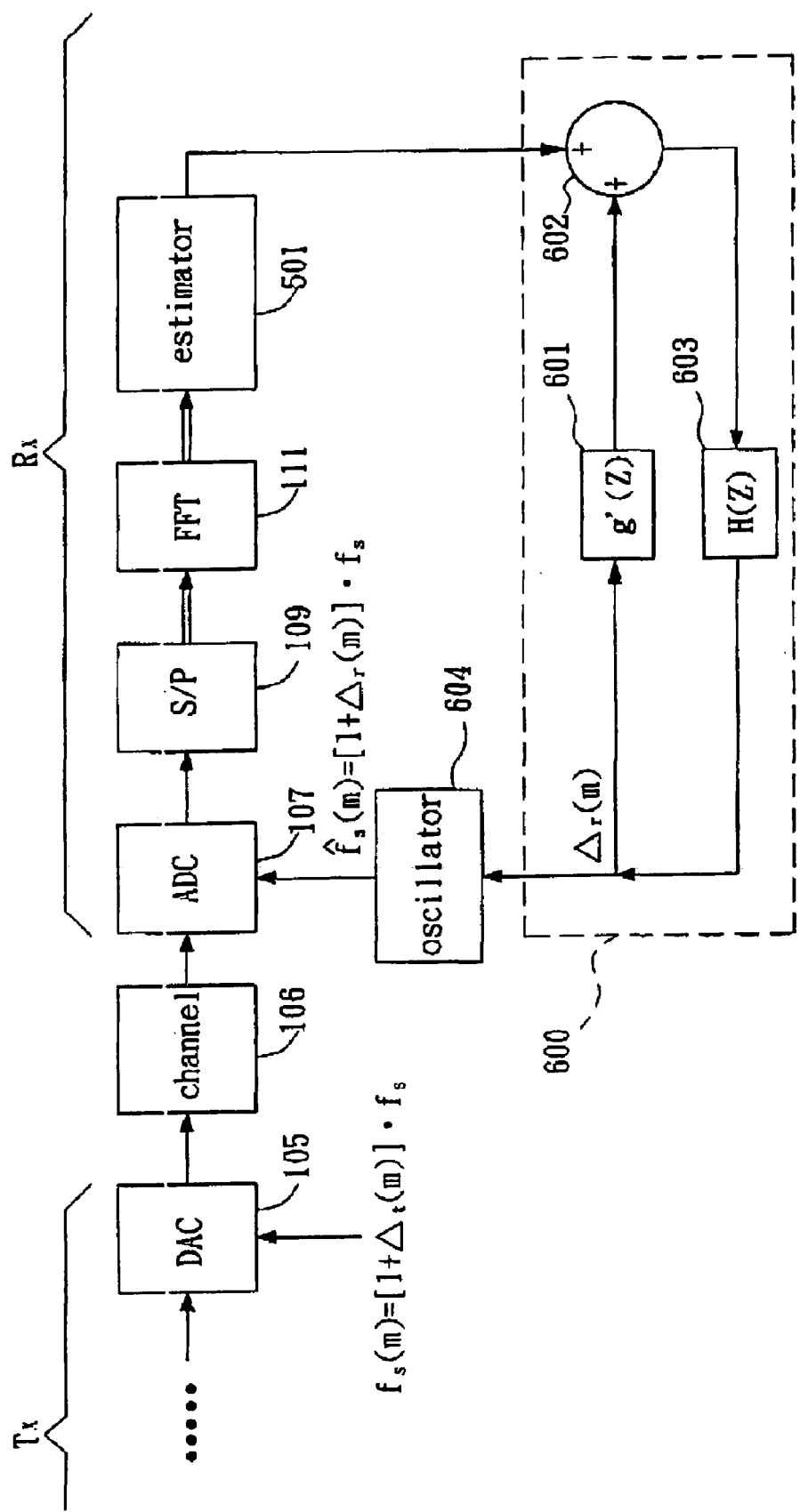
FIGS. 6A and 6B are block diagrams of the apparatus used in a multi-carrier communication system according to the present invention.

FIG. 6A is a block diagram of the apparatus for synchronizing sampling frequency and carrier frequency 600 used in the multi-carrier communication system 100 according to the embodiment of the present invention. As shown in FIG.

6A, the apparatus 600 is used to synchronize sampling frequency of the receiver and that of the transmitter of the communication system 100, where the sampling frequency $f_s(m)$ of the transmitter is $[1+\Delta_t(m)]f_s$, the sampling frequency $\hat{f}_s(m)$ of the receiver is $[1+\Delta_r(m)]f_s$, and m is the symbol number index. The receiver includes the estimator 501 for estimating a frequency offset the apparatus 600 comprises: a compensation loop filter g'(z) 601 for generating a first output in response to the frequency offset compensation $\Delta_r(m)$ of the receiver; an adder 602 for adding the estimated frequency offset outputted from the estimator 501 and the first output from compensation loop filter 601 to generate a second output; and a loop filter H(z) 603 for receiving the second output from the adder 602, and for generating a new frequency offset compensation to replace the previous frequency offset compensation. The new frequency offset compensation is then fed back to the oscillator 604 to compensate the frequency offset of the receiver.

Figure 6B:
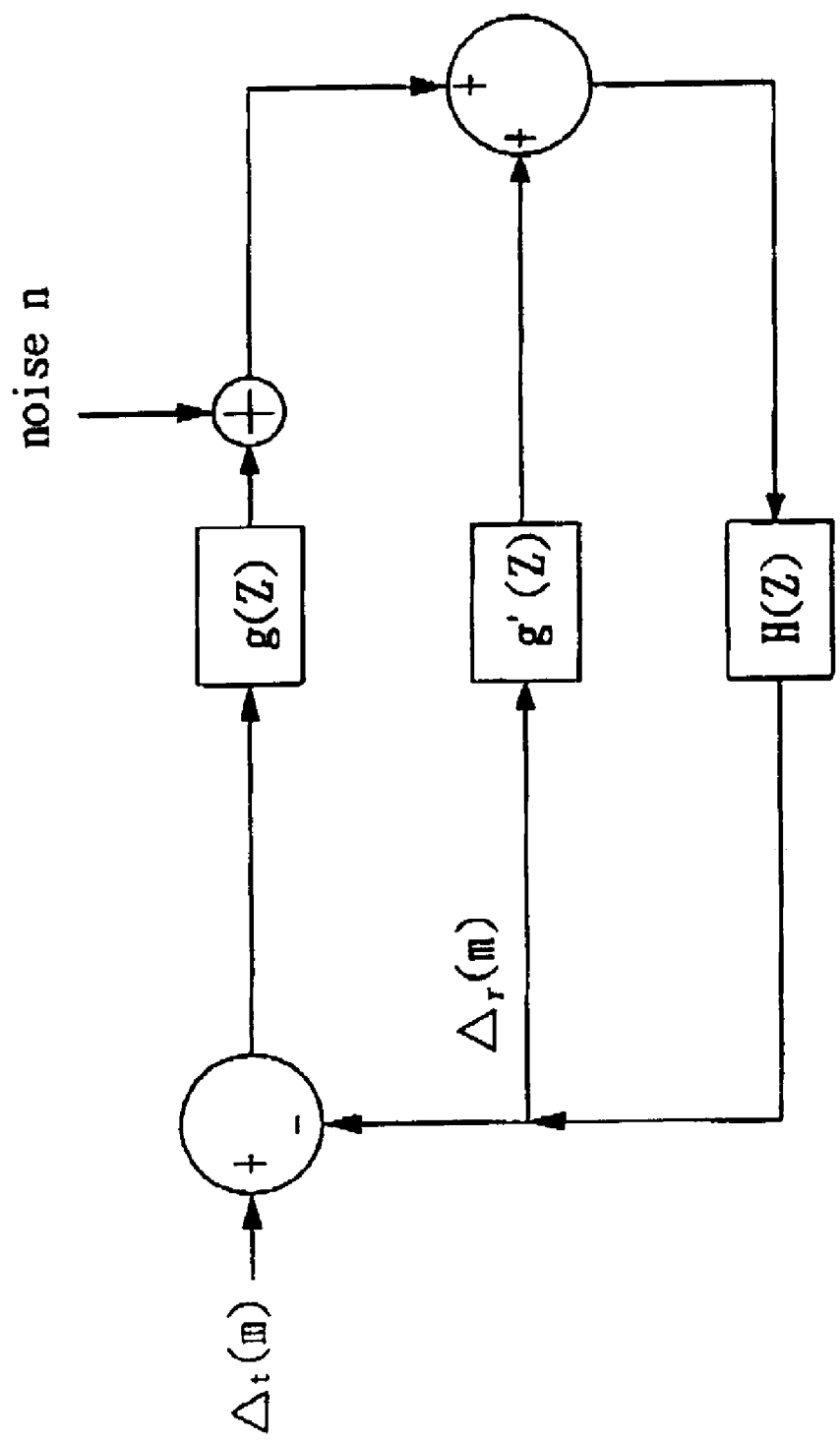

The behavior model of FIG. 5C can be combined with the apparatus 600, as shown in FIG. 6B, for further analysis. The noise n is added to reflect the practical situation. It can be derived from the compensation loop of FIG. 6B that $$\{[\Delta_t(z)-\Delta_r(z)]g(z)+n+\Delta_r(z)g'(z)\}H(z)=\Delta_r(z)=H(z)g(z)$$
$$\Delta_r(z)+nH(z)=\Delta_t(z)\{1+[g(z)-g'(z)]H(z)\} \quad (1\text{-}4)$$

If we make g'(z)=g(z), then Equation (1-4) becomes $$\Delta_r(z)=H(z)g(z)\,\Delta_t(z)+nH(z) \quad (1\text{-}5)$$

From Equation (1-3), $$g(z) = \frac{1}{2}z^{-D-1}(1+z^{-1}),$$

which is a low-pass filter with a finite impulse response. The loop filter H(z) can be designed as a low-pass filter to remove the noise, and then H(z)g(z) is also a low-pass filter. Therefore, $\Delta_r(z)$ in Equation (1-5) may be regarded as in outcome of the time-variant signal $\Delta_t(z)$ passing through a low-pass filter. Generally speaking, $\Delta_t(z)$ is varied slowly and not much affected when passed through the low-pass filter. Thus, the estimated $\Delta_r(z)$ would be very close to $\Delta_t(z)$, and the object of the present invention can then be achieved.

It should be noted that besides g(z), the compensation loop filter g'(z) 601 may have other implementations. For instance, it is feasible to make $g'(z)=z_{-D-1}$ to compensate the response of g(z). Besides, H(z) can be time-variant. For example, let H(z)=1 at the early period of frequency offset tracking, and then let H(z) equal to $$\frac{1}{2}(1+z^{-1}), \frac{1}{3}(1+z^{-1}+z^{-2})\dots,$$

$$\frac{1}{n}(1+z^{-1}+z^{-2}+\dots+z^{-n+1})$$

in order. In this way, the frequency offset can be tracked quickly and precisely.

Figure 7:
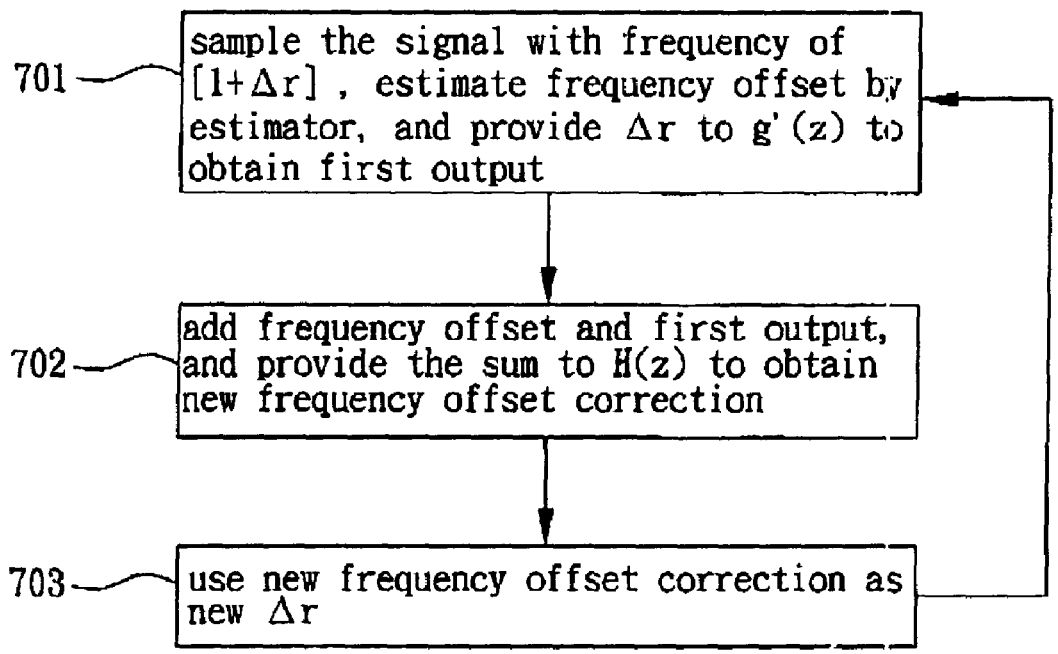
FIG. 7 is a flow chart of the method according to the present invention.

FIG. 7 is a flow chart of the compensation method according to the embodiment of the present invention. As shown in FIG. 7, when the receiver receives a signal from the transmitter, the apparatus 600 of FIG. 6A performs the following steps:

701 processing the signal by using $[1+\Delta_r(m)]f_s$ as the sampling frequency of the receiver, estimating the sampling frequency offset by the estimator 501, and providing $\Delta_r(m)$ to the compensation loop filter g'(z) 601 to obtain a first output, wherein $\Delta_r(m)$ is a time-variant signal;

702 adding the estimated sampling frequency offset and the first output, and providing the sum to the loop filter H(z) 603 to obtain a frequency offset compensation; and

703 using the frequency offset compensation as a new $\Delta_r(m)$, and repeating the previous steps.

Figure 8:
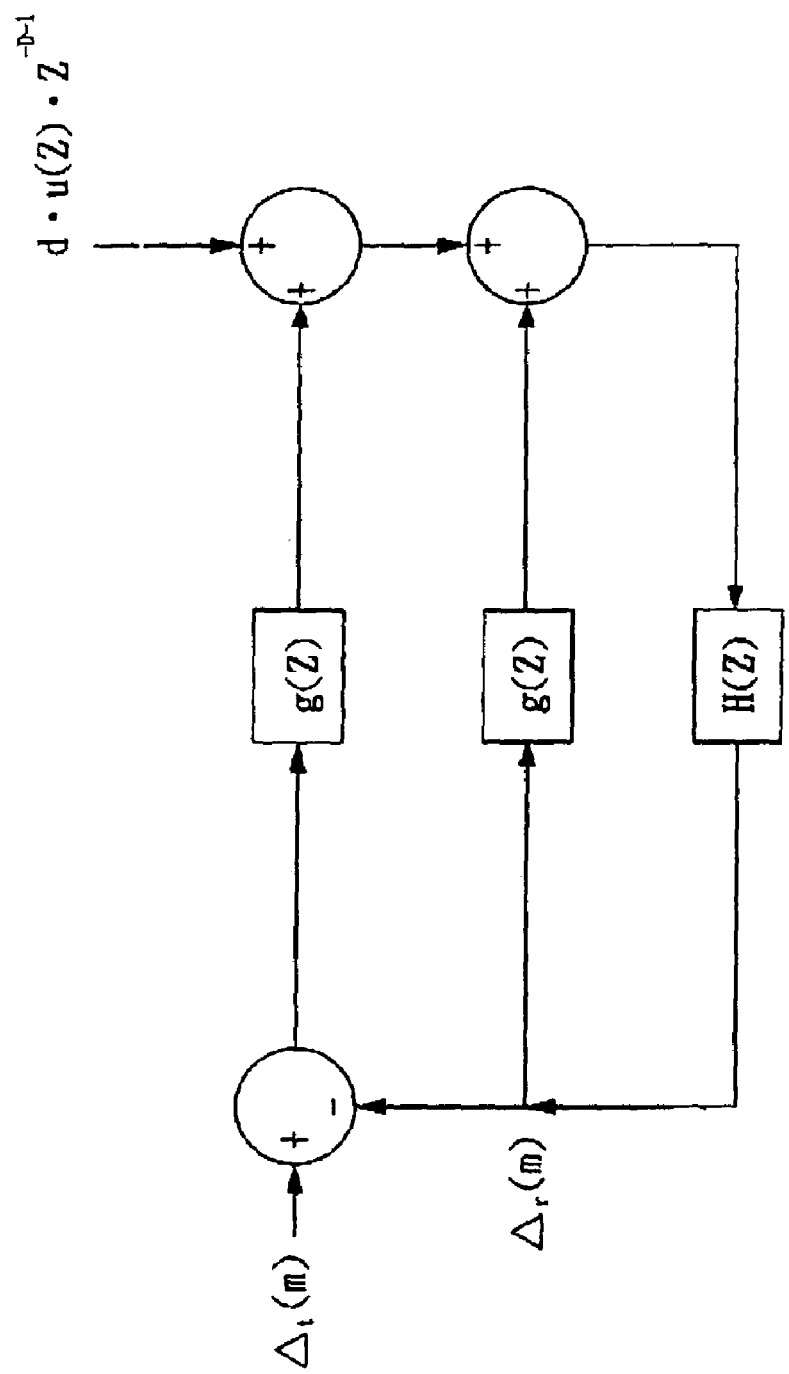
FIG. 8 is a block diagram showing an application of the behavior model of FIG. 6B.

An example is provided here to further explain the above steps. Assume there exists a rather large frequency offset, depicted as a constant d, between the sampling frequencies of the transmitter and receiver of the communication system 100. A typical value of d lies from tens to one hundred ppm. This frequency offset would cause $\Delta(m)$ of FIG. 6A to have an output d. However, since a delay $Z_{-D-1}$ is generated when the system 100 processes the signal, a frequency offset d would be reflected in $\Delta(mn)$ after the delay passes. Therefore, we can modify the behavior mode of FIG. 6B to accommodate this case, as shown in FIG. 8. A transient analysis for the communication system 100 according to the model of FIG. 8 is performed as below:

$$\Delta_r(z)=H(z)g(z)\Delta_r(z)+d\cdot u(z)\cdot z^{-D-1}H(z) \quad (1\text{-}6)$$

where u(z), the z-transform of a unit-step signal, is used to simulate the initial status of signal transceiving of the system 100.

It is assumed that $\Delta_r(z)$ is relatively small compared to the quantity of frequency offset d and can thus be neglected. Then Equation (1-6) becomes $$\Delta_r(z)\approx d\cdot u(z)\cdot z^{-D-1}H(z)$$

Accordingly, if there is a frequency offset d, the tracking time required by the method disclosed in the embodiment of the present insertion is only relative to H(z) and total delay $Z^{-D-1}$, which is resulted from signal processing of the system 100. Assume $$H(z) = \frac{1}{2}(1+z^{-1})$$

and D=1, then $$\Delta_r(z)\approx d(0.5z^{-2}+z^{-3}+\dots)$$

That is, the communication system needs only a time period of three symbols to track the sampling frequency offset.

Figure 9:
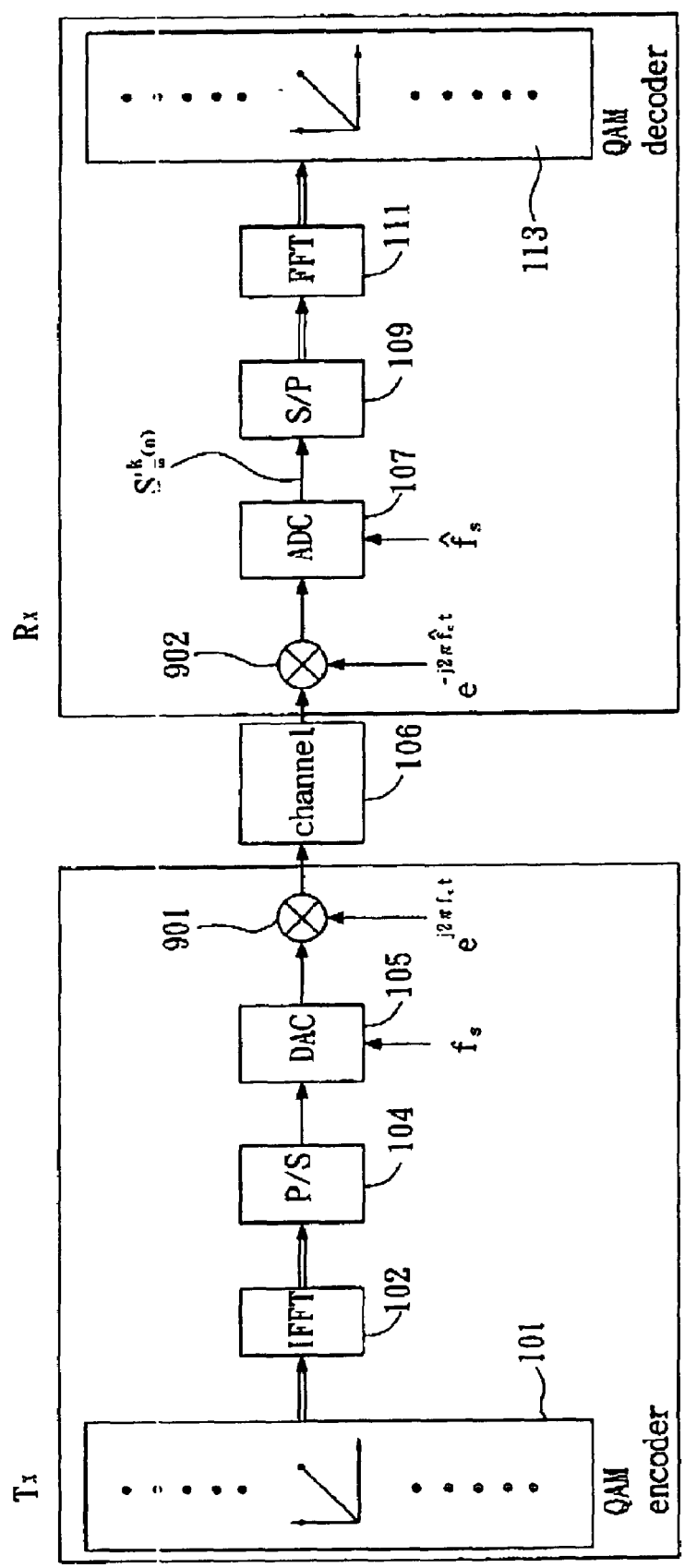
FIG. 9 is a block diagram showing that a multi-carrier communication system employs a carrier to transmit signals.

Furthermore, the method disclosed in the embodiment of the present invention can also be applied to track carrier frequency. FIG. 9 is a block diagram showing that the multi-carrier communication system 100 employs carriers for transmitting signals. As shown in FIG. 9, the transmitter of the system 100 uses a mixer 901 to multiply the signals with $e^{j2\pi f_c^t}$, i.e. a carrier with a frequency $f_c$, thereby modulating baseband signals outputted from the IFFT circuit 102 to a higher frequency band for transmission, The receiver uses another mixer 902 to demodulate received signals to the baseband by multiplying with $e^{-j2\pi f_c^t}$, and then sends there into the FFT circuit 111 for further demodulation. Since $f_c\ne \hat{f}_c$, it is necessary for the receiver to perform estimation and compensation of carrier frequency offsets. By applying the above mathematic model, similar physical Phenomena are obtained, and thus the compensation method of the present invention can be used to design a carrier frequency tracking loop.

Next, a mathematic analysis for the carrier frequency offset is provided as follows:

Let $f_s$ be a sampling frequency $f_c(m)$ be a carrier frequency of the transmitter $\hat{f}_c(m)$ e a carrier frequency of the receiver m be a symbol number index and $f_c(m)=f_c+df_c(m)$ $\hat{f}_c(m)=f_c+d\hat{f}_c(m)$ where $f_c$ is an ideal carrier frequency required by the specification of the communication system 100.

It is reasonable to assume that the carrier frequency offset is constant during the same symbol. Since $df_c(m) \neq d\hat{f}_c(m)$, the carrier frequency offset is generated. By inferring in the way similar to the case of sampling frequency, the effects caused by this frequency offset are:

(1) The output of the FFT circuit 111 generates "constellation distortion" for the m-th symbol being sampled. If the same notations in the previous analysis are used, then $$S_m^k(n) = a_m^k \cdot H_k \cdot e^{j w_k' m}, n=0 \sim N-1$$

where $$w_k' = 2\pi \left[ \frac{k}{N} + \Delta \right]$$

is the carrier frequency of k-th sub-channel $\Delta = [df_c - d\hat{f}_c]/f_s$ is the carrier frequency offset.

The output signal of k-th sub-channel of the FFT circuit 111 is $$r_k = d_m^k H_k \left[ \frac{\sin(\pi N \Delta)}{\sin(\pi \Delta)} \right] e^{j(N-1)\pi\Delta}$$

Accordingly, if there is an offset $\Delta$ between the carrier frequencies of the transmitter and the receiver, then the received signals of all the sub-channels are attenuated by $$\frac{\sin(\pi N \Delta)}{N \sin(\pi \Delta)}$$

times and rotates with an angle of $(N-1)\pi\Delta$. The former approximates to 1 and is negligible, while the latter is not negligible.

Figure 10A:
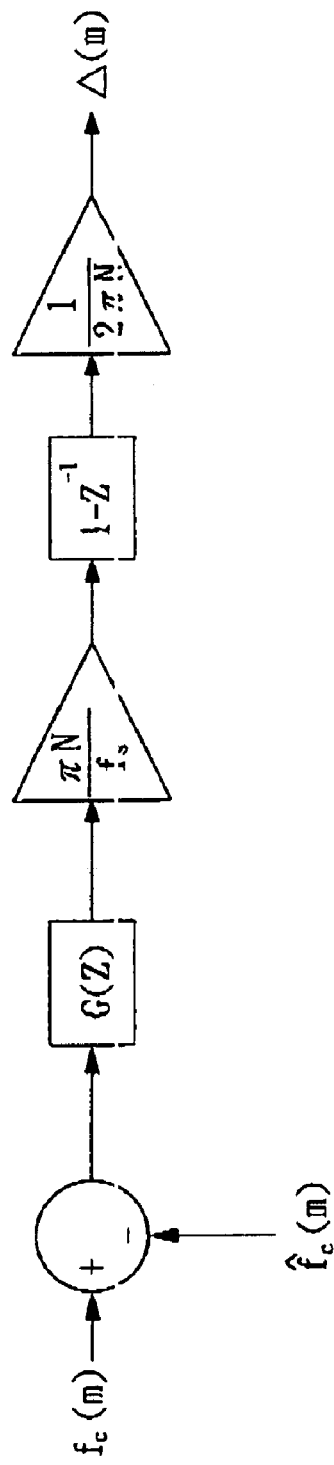
FIGS. 10A and 10B are block diagrams of a behavior model simplified from the communication system of FIG. 9.
Figure 10B:
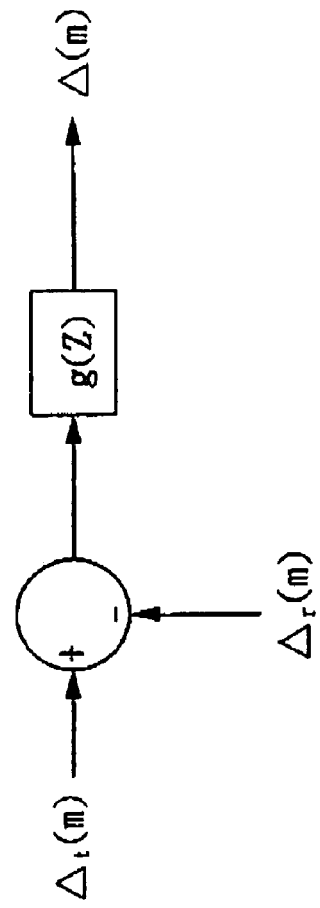

(2) An additional angle rotation is generated for subsequent demodulated symbols. During the same symbol, the angle rotation resulted from the carrier frequency offset is accumulated as $2\pi (N+\upsilon)\Delta$. Similarly, we can derive the behavior model of the system 100 which uses the carrier, as shown in FIGS. 10A and 10B, where $$G(z) = z^{-D-1}[a + bz^{-1} + bz^{-2} + \ldots] \approx z^{-D-1}[1 + 2z^{-1} + 2z^{-2} + \ldots]$$

$$g(z) = \frac{1}{2} z^{-D-1}[a + (b-a)z^{-1}] \approx \frac{1}{2} z^{-D-1}(1 + z^{-1})$$

$$a = \frac{N-1}{N} \approx 1, b = 2 \cdot \frac{N+\upsilon}{N} \approx 2$$

$$\Delta_t(m) = df_c(m)/f_s, \Delta_r(m) = d\hat{f}_c(m)/f_s$$

Figure 11A:
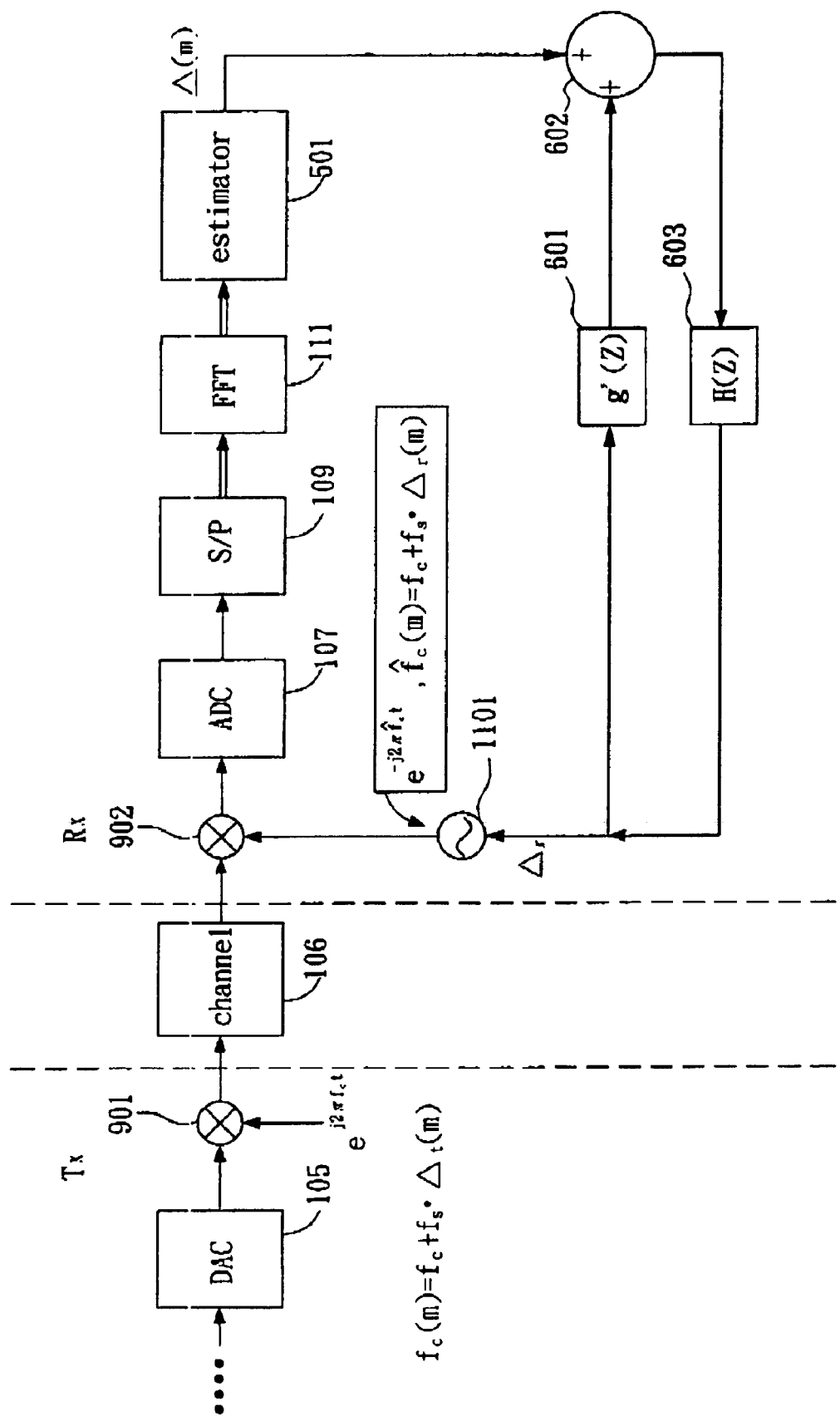
FIG. 11A is a block diagram showing an apparatus used in the system of FIG. 9 according to a preferred embodiment of the present invention.
Figure 11B:
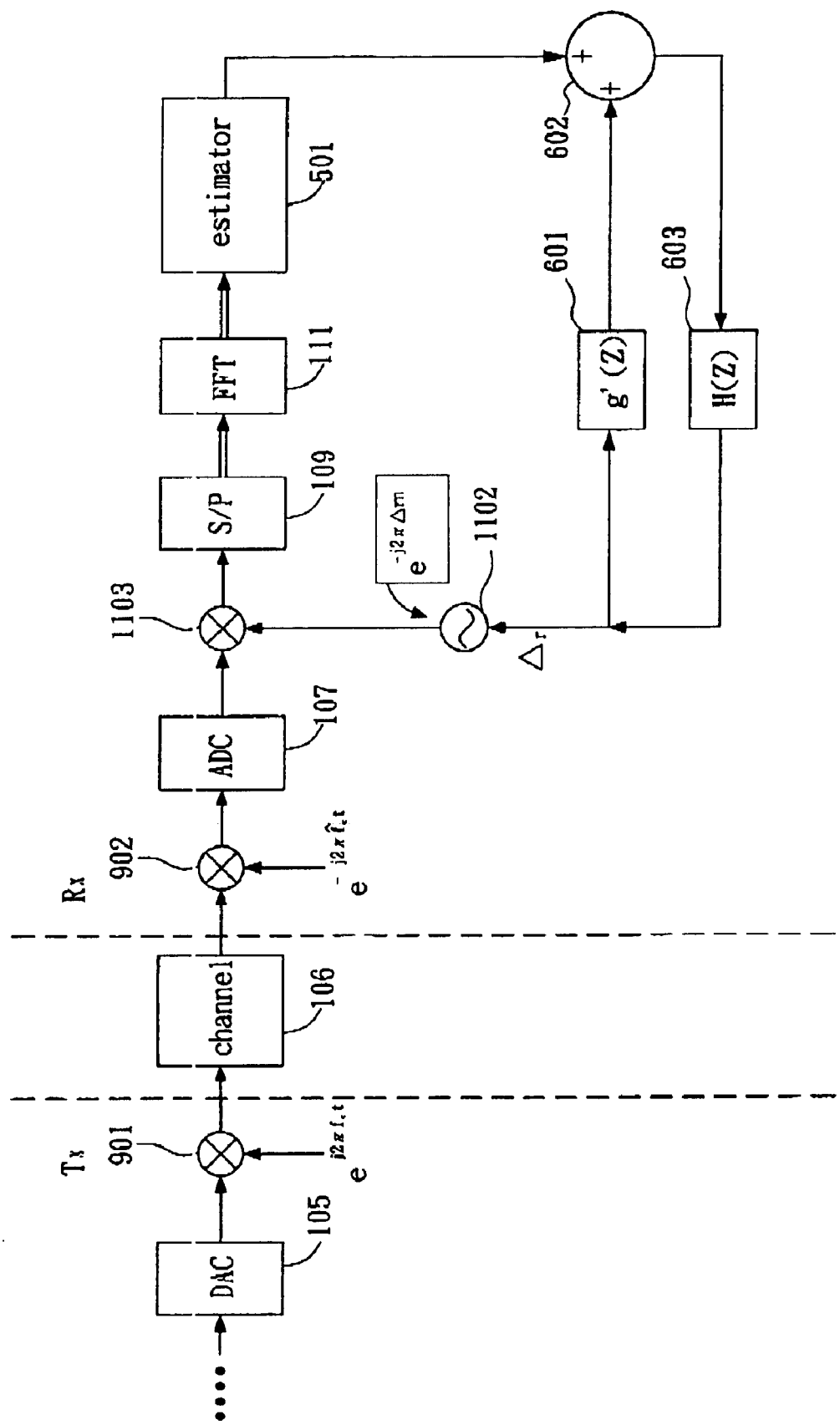
FIG. 11B is a block diagram showing an apparatus used in the system of FIG. 9 according to a preferred embodiment of the present invention.

FIGS. 11A and 11B are two other embodiments of the present invention. According to the above-disclosed analysis, once the compensated frequency offset is determined, the frequency compensation can be executed in different devices of the receiver. In FIG. 11A, the compensated frequency offset is inputted into the mixer 902 at the receiver via a voltage-controlled oscillator (VCO) 1101. The voltage-controlled oscillator 1101 is for outputting the demodulated carrier signals of which the frequency is adjusted according to the compensated frequency offset. Then, the mixer 902 demodulated the signals from the transmitter with the carrier signals. The carrier frequency offset between the transmitter and this receiver can thus be compensated. In FIG. 11B, the compensated frequency offset is inputted into a phase rotator 1103 for rotating a signal outputted from the ADC 107 via a phase accumulator 1102. The phase accumulator 1102 is for outputting the phase rotated signal according to the compensated frequency offset. The frequency offset between the transmitter and the receiver can thus be compensated. It should be noted that the operation of the oscillator 604 of FIG. 6A, 1101 of FIG. 11A, and 1102 of FIG. 11B may be different and the signal outputted from the oscillator 604 of FIG. 6A, 1101 of FIG. 11A, and 1102 of FIG. 11B may be in different format, as shown in FIG. 6A, FIG. 11A, and FIG. 11B respectively. However, people who skilled in the art can easily accomplish the embodiments disclosed in FIG. 11A and FIG. 11B according to the disclosure of the specification.

While the present invention has been shown and described with reference to two preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. An apparatus for synchronizing frequencies of a receiver and a transmitter of a multi-carrier communication system, wherein the receiver includes an estimator for estimating a frequency offset according to a signal received from the transmitter and producing an estimated frequency offset, comprising:

a first loop filter, generating a first output in response to a frequency offset compensation;

an adder, adding the estimated frequency offset and the first output and generating a second output; and a second loop filter, generating the frequency offset compensation according to the second output.

2. The apparatus of claim 1, wherein the frequency offset is a sampling frequency offset between the transmitter and the receiver.

3. The apparatus of claim 1, wherein the frequency offset is a carrier signal offset between the receiver and the transmitter.

4. The apparatus of claim 1, further comprising:

an oscillator coupled to the second loop filter and generating a compensated signal of the receiver according to the frequency offset compensation.

5. The apparatus of claim 1, further comprising:

an oscillator coupled to the second loop filter and generating a sampling frequency of the receiver according to the frequency offset compensation;

an analog-to-digital converter for sampling a signal from the transmitter with the sampling frequency to generate a digital received signal; and a transformer for generating the received signal according to the digital received signal.

6. The apparatus of claim 1, further comprising:
a phase accumulator for outputting a phase rotated control signal according to the frequency offset compensation;
a phase rotator for rotating a signal from the transmitter to generate a phase rotated signal according to the phase rotated control signal; and
a transformer for generating the received signal according to the phase rotated signal.

7. The apparatus of claim 1, further comprising:
an oscillator for outputting a carrier signal according to the frequency offset compensation;
a mixer for mixing a signal from the transmitter with the carrier signal, and outputting a mixed signal; and
a transformer for generating the received signal according to the mixed signal.

8. The apparatus of claim 1, wherein the second loop filter is a time-variant low-pass filter.

9. The apparatus of claim 1, wherein the second loop filter is a time-invariant low-pass filter.

10. A method for synchronizing frequencies of a receiver and a transmitter of a multi-carrier communication system, comprising:
estimating a frequency offset, wherein the frequency offset is the difference between a frequency of the transmitter and t frequency of the receiver;
generating a frequency offset compensation according to the frequency offset;
generating a first output by a first loop-filter according to the frequency offset compensation;
adding the frequency offset and the first output; and
generating a second output as the frequency offset compensation by a second loop-filter according to a result of the adding.

11. The method of claim 10, wherein the frequency offset is a sampling frequency offset between the transmitter and the receiver.

12. The method of claim 10, further comprising:
modifying a sampling frequency of the receiver according to the frequency offset compensation.

13. The method of claim 10, further comprising:
modifying a phase rotated control signal of the receiver according to the frequency offset compensation.

14. The method of claim 10, further comprising:
modifying a carrier signal of the receiver according to the frequency offset compensation.

15. An apparatus for synchronizing frequencies of a receiver and a transmitter of a multi-carrier communication system, comprising:
a frequency estimator for producing an estimated frequency offset according to a received signal;
a first loop filter, generating a first output in response to a frequency offset compensation;
an adder, adding the estimated frequency offset and the first output and generating a second output; and
a second loop filter, generating the frequency offset compensation according to the second output.

16. The apparatus of claim 15, further comprising:
an oscillator for outputting a sampling frequency according to the frequency offset compensation;
an analog-to-digital converter for sampling a signal from the transmitter with the sampling frequency to generate a digital received signal; and
a transformer for generating the received signal according to the digital received signal.

17. The apparatus of claim 15, further comprising:
a phase accumulator for outputting a phase rotated control signal according to the frequency offset compensation;
a phase rotator for rotating a signal from the transmitter to generate a phase rotated signal according to the phase rotated control signal; and
a transformer for generating the received signal according to the phase rotated signal.

18. The apparatus of claim 15, further comprising:
an oscillator for outputting a carrier signal according to the frequency offset compensation;
a mixer for mixing a signal from the transmitter with the carrier signal, and outputting a mixed signal; and
a transformer for generating the received signal according to the mixed signal.

19. The apparatus of claim 15, wherein the second loop filter is a time-variant low-pass filter.

20. The apparatus of claim 15, wherein the second loop filter is a time-invariant low-pass filter.

* * * * *